United States Patent
Kazama et al.

(10) Patent No.: US 8,786,134 B2
(45) Date of Patent: Jul. 22, 2014

(54) WIRELESS POWER TRANSMITTING SYSTEM, POWER RECEIVING STATION, POWER TRANSMITTING STATION, AND RECORDING MEDIUM

(75) Inventors: Satoshi Kazama, Kawasaki (JP);
Yoshiyasu Nakashima, Kawasaki (JP);
Seiki Shibata, Kawasaki (JP); Yuki Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 268 days.

(21) Appl. No.: 12/749,670

(22) Filed: Mar. 30, 2010

(65) Prior Publication Data

US 2010/0264746 A1 Oct. 21, 2010

(30) Foreign Application Priority Data

Mar. 31, 2009 (JP) ................... 2009-085326

(51) Int. Cl.
*H01F 27/42* (2006.01)
*H01F 37/00* (2006.01)
*H01F 38/00* (2006.01)

(52) U.S. Cl.
USPC .......................................... 307/104

(58) Field of Classification Search
USPC ............................ 307/104; 320/108
See application file for complete search history.

(56) References Cited

U.S. PATENT DOCUMENTS

2007/0260116 A1 11/2007 Shigemori et al.
2010/0036773 A1* 2/2010 Bennett ........................ 705/67

FOREIGN PATENT DOCUMENTS

| JP | 2005-100164 | 4/2005 |
|---|---|---|
| JP | 2007-61191 | 3/2007 |
| JP | 2008-283789 | 11/2008 |
| JP | 2008-283792 | 11/2008 |
| JP | 2008-284160 | 11/2008 |

OTHER PUBLICATIONS

Japanese Office Action mailed Feb. 4, 2014 in corresponding to Japanese Application No. 2009-085326.

* cited by examiner

*Primary Examiner* — Carlos Amaya
(74) *Attorney, Agent, or Firm* — Staas & Halsey LLP

(57) ABSTRACT

A wireless power transmitting system that transmits power from a power transmitting station to a power receiving station wirelessly includes the power receiving station. The power receiving station includes a unit receiving power from the power transmitting station, a unit obtaining a level of power received through the antenna, a unit obtaining a level of power consumed by the device operating while being supplied with received power and a unit transmitting the received power level and the power consuming level to the power transmitting station wirelessly. The power transmitting station includes a unit receiving the received power level and the power consuming level from the power receiving station wirelessly, a unit controlling the level of power transmitted through the transmitting antenna based on the difference between the received power level and the received power consuming level, and a unit transmitting power to the power receiving station wirelessly.

13 Claims, 10 Drawing Sheets

| OPERATING DEVICE EXCLUDING CPU | MARGIN POWER LEVEL Pm |
|---|---|
| DEVICES EXCLUDING CPU IN LOW POWER MODE | 0.1 W |
| HDD | 2 W |
| ODD | 4 W |
| AUDIO | 0.5 W |
| USB1 PORT | 3 W |
| USB2 PORT | 5 W |
| HDD,ODD | 5 W |
| HDD, | 2 W |
| HDD, USB1port | 4 W |
| HDD, USB2port | 6 W |
| ODD,AUDIO | 4 W |
| ⋮ | ⋮ |

WIRELESS POWER TRANSMITTING SYSTEM, POWER RECEIVING STATION, POWER TRANSMITTING STATION, AND RECORDING MEDIUM

CROSS-REFERENCE TO RELATED APPLICATIONS

This application is based upon and claims the benefit of priority of the prior Japanese Patent Application No. 2009-85326, filed on Mar. 31, 2009, the entire contents of which are incorporated herein by reference.

BACKGROUND

1. Field

The present embodiments discussed herein relate to a wireless power supply system. In particular, the present embodiments relate to a control apparatus to transmit power in the wireless manner.

2. Description of the Related Art

In a known wireless power transmitting system, a power transmitting apparatus transmits power in the wireless manner to a power receiving apparatus using an electromagnetic wave. The power receiving apparatus converts the received electromagnetic wave into power and supplies the resultant power to a power consuming device or circuit in the power receiving apparatus.

In a known wireless power supply system, a position and orientation detecting unit detects the position and orientation of a receiving antenna and transmits information concerning the detected position and orientation to a controller of a power transmitting apparatus. The controller determines control target values of, for example, the magnitudes, phases, and frequencies of currents flowing through transmission coils so as to optimize the intensity of a magnetic field generated or received in the position and orientation of the receiving antenna, and performs control so that currents having values equal to the control target values flow through the transmission coils via driving circuits. Thus, the receiving antenna may be supplied with power with efficiency at all times.

As a well-known wireless power transmitting system, a wireless sensor system including a wireless sensor unit and a sensor signal receiver has been known. The wireless sensor unit includes a sensor section detecting a target of detection, a sensor signal transmitting section transmitting a sensor signal output from the sensor section in a wireless manner, and a power supply section. The power supply section of the wireless sensor unit includes power generating means and a power receiving portion which receives driving power wireless-transmitted. The wireless sensor unit further includes a power supply monitoring section. When power produced by power generation is insufficient, the wireless sensor unit transmits a power shortage signal, thus allowing wireless power supply. The above-described known systems are discussed in, for example, Japanese Unexamined Patent Application Publication No. 2008-283789 and No. 2005-100164.

As another wireless power transmitting system, there has been known a capsule endoscope system including an external unit which includes a transmitting antenna, a receiving antenna for receiving power transmitted by the transmitting antenna, a capsule endoscope which includes a receiving circuit section and a capsule endoscope functioning section. In the capsule endoscope system, a capsule endoscope includes a received power detecting unit that detects power received by the receiving antenna and an imaging rate controller that changes the rate of imaging by the capsule endoscope. When received power detected by the received power detecting unit is lower than a preset threshold value, the imaging rate controller reduces the imaging rate. Consequently, the capsule endoscope may be controlled so that the endoscope does not stop operating even if the efficiency of receiving power supplied from the wireless power supply system is lowered (refer to Japanese Unexamined Patent Application Publication No. 2008-284160).

In a known intra-subject information acquiring system, a remaining-power recognizing circuit included in a capsule endoscope recognizes the amount of remaining power of the capsule endoscope and superimposes information indicating the amount of remaining power on a transmission signal. An RF transmitter in the capsule endoscope transmits the transmission signal to a receiving apparatus on the outside of a subject. A remaining-power detecting circuit included in the receiving apparatus detects the information indicating the amount of remaining power. A display unit of an external apparatus displays the detected information (refer to Japanese Unexamined Patent Application Publication No. 2007-61191).

SUMMARY

It is an aspect of the embodiments discussed herein to provide a wireless power transmitting system. The wireless power transmitting system transmits power from a power transmitting station to a power receiving station wirelessly. The power receiving station includes a unit receiving power from the power transmitting station, a unit obtaining a level of power received through the antenna, a unit obtaining a level of power consumed by the device operating while being supplied with received power and a unit transmitting the received power level and the power consuming level to the power transmitting station wirelessly. The power transmitting station includes a unit receiving the received power level and the power consuming level from the power receiving station wirelessly, a unit controlling the level of power transmitted through the transmitting antenna based on the difference between the received power level and the received power consuming level, and a unit transmitting power to the power receiving station wirelessly.

The object and advantages of the embodiment discussed herein will be realized and attained by means of elements and combinations particularly pointed out in the claims.

It is to be understood that both the foregoing general description and the following detailed description are exemplary and only are not restrictive exemplary explanatory are not restrictive of the invention, as claimed.

The above-described embodiments of the present invention are intended as examples, and all embodiments of the present invention are not limited to including the features described above.

DETAILED DESCRIPTION OF THE PREFERRED EMBODIMENTS

Figure 1:
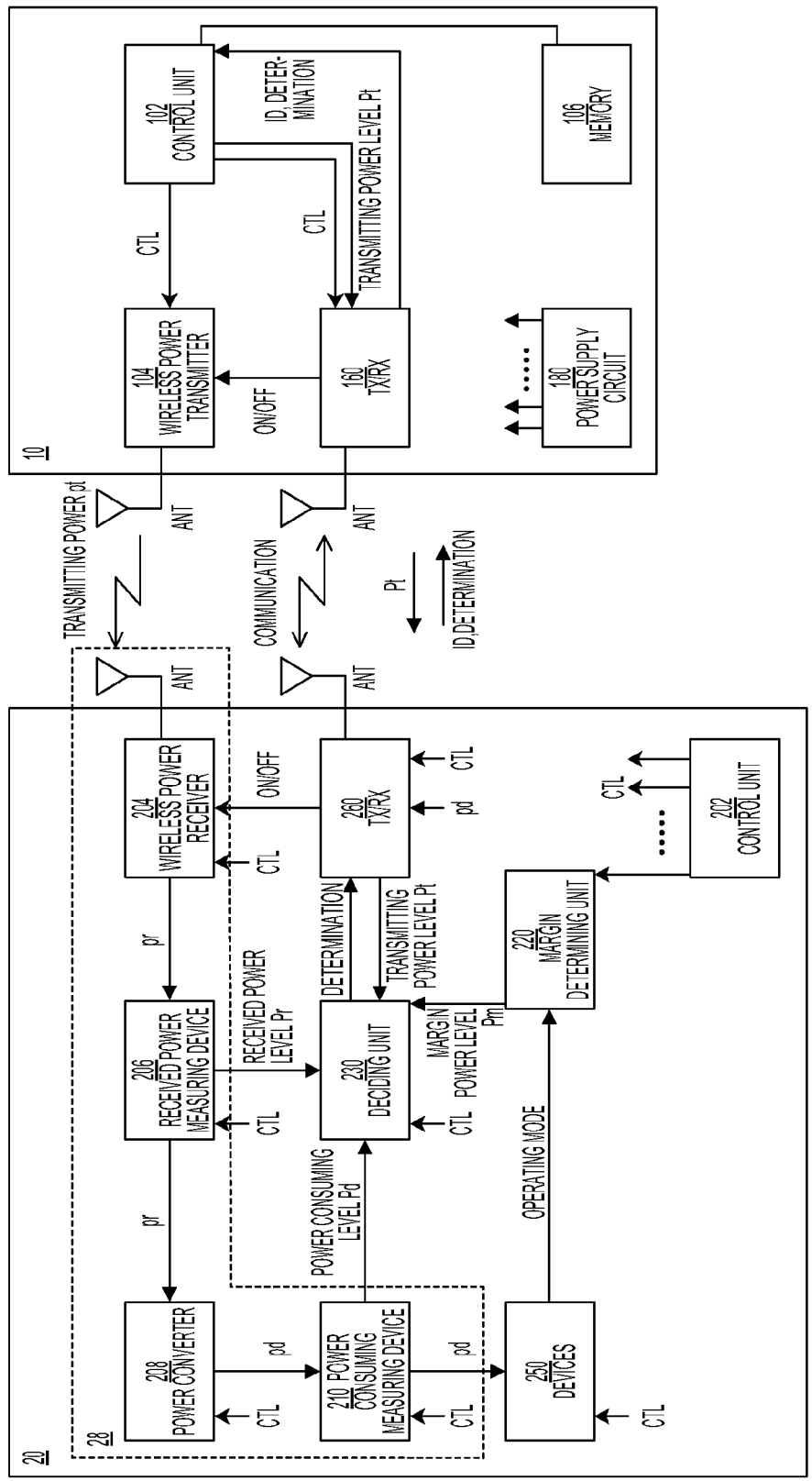
FIG. 1 depicts an example of a wireless power transmitting system according to an embodiment of the present invention, which includes a power transmitting station and an information terminal or electronic apparatus which serves as a power receiving station.

Reference may now be made in detail to embodiments of the present invention, examples of which are illustrated in the accompanying drawings, wherein like reference numerals refer to like elements throughout.

In a known wireless power transmitting system, a power transmitting apparatus transmits a given power to a power receiving apparatus.

The inventors have recognized that when the power consumption of the power receiving apparatus varies and decreases, part of the received power may be wasted without being consumed. The inventors have further recognized that when the distance between the power transmitting apparatus and the power receiving apparatus is shorter than an assumed distance, a part of the received power may be wasted in the power receiving apparatus.

Furthermore, the inventors have recognized that power supplied for transmitting power may be reduced by controlling transmitting power in the power transmitting apparatus in accordance with a change in power consumption in the power receiving apparatus.

It is to be understood that both the foregoing general description and the following detailed description are exemplary and explanatory and are not intended to restrict the present invention.

An embodiment of the present invention will be described with reference to the drawings. In the drawings, the same components and elements are designated by the same reference numerals.

FIG. 1 depicts a wireless power transmitting system according to an embodiment of the present invention, the system including a power transmitting station 10 and an information terminal or electronic apparatus 20 which serves as a power receiving station.

The power transmitting station 10 includes, for example, a controller 102, a wireless power transmitter 104 for power supply, a memory 106, a transmitter-receiver (TX/RX) 160 for wireless communication, and a power supply circuit 180. The wireless power transmitter 104 includes an antenna (ANT) to transmit power wireless. The transmitter-receiver 160 is connected to an antenna (ANT) to communicate in the wireless manner. The power transmitting station 10 may be, for example, a wireless LAN base station (AP) including the transmitter-receiver 160.

The information terminal 20 includes, for example, a controller 202, a wireless power receiver 204 for receiving power, a received power measuring device 206, a power converter 208 that converts alternating current (AC) to direct current (DC), a power consumption measuring device 210, a margin determining unit 220, a deciding unit 230, a plurality of devices (components, or elements) or circuits 250 which use or consume received power, and a transmitter-receiver (TX/RX) 260 for communication. The elements 204, 206, 208, and 210 may constitute a power receiver 28 which serves as a device. The information terminal 20 may be, for example, a personal computer or a personal digital assistant (PDA). The wireless power receiver 204 includes an antenna (ANT) to receive power. The transmitter-receiver 260 is connected to an antenna (ANT) to communicate in the wireless manner. The devices 250 may include devices (elements), such as a central processing unit (CPU), a hard disk drive (HDD), an optical disk drive (ODD), an audio device, and a USB port. The controller 202, the margin determining unit 220, and the deciding unit 230 may be some of functions realized by the CPU.

The controller 102 supplies a control signal CTL to an element, for example, the wireless power transmitter 104 and the transmitter-receiver 160 in the power transmitting station 10. The controller 102 controls transmitting power pt to be transmitted by the wireless power transmitter 104 in accordance with a result of determination received from the information terminal 20, feedback information, or a control signal. The controller 102 or the transmitter-receiver 160 may control power-on/off of the wireless power transmitter 104.

The wireless power transmitter 104, which is powered on by the controller 102 or the transmitter-receiver 160, transmits or supplies, through the antenna, power based on an un-modulated electromagnetic wave in a frequency band of, for example, 0.3 GHz to 100 GHz controlled in accordance with the control signal CTL of the controller 102. A maximum transmitting power output from the wireless power transmitter 104 is, for example, 60 W. The transmitter-receiver 160 transmits and receives RF signals, carrying necessary information, to and from the transmitter-receiver 260 with one or two transmitting and receiving radio frequencies (e.g., 13.56 MHz or/and 2.4 GHz) different from the frequency using transmitting power of the wireless power transmitter 104 in accordance with a short-range communication standard, such as Wireless LAN Standard, Bluetooth Standard, or Near Field Communication (NFC) Standard.

The controller 202 supplies a control signal CTL to an element, for example, the wireless power receiver 204, the received power measuring device 206, the power converter 208, the power consumption measuring device 210, the deciding unit 230, the devices 250, and the transmitter-receiver 260 in the information terminal 20. The controller 202 or the transmitter-receiver 260 may control power-on/off of the wireless power receiver 204.

The transmitter-receiver 160 in the power transmitting station 10 transmits an RF signal carrying information indicating a transmitting power level Pt supplied from the controller 102.

The transmitter-receiver 260 in the information terminal 20 receives the RF signal carrying the information indicating the transmitting power level Pt from the power transmitting station 10 and supplies the transmitting power level Pt to the deciding unit 230. The wireless power receiver 204 receives power based on the un-modulated electromagnetic wave from the wireless power transmitter 104 through the antenna and supplies the power, indicated at pr, received through the antenna to the received power measuring device 206. The received power measuring device 206 measures the intensity of the received power pr supplied from the wireless power receiver 204 and supplies a received power level Pr indicating the intensity of the received power pr to the deciding unit 230. The power converter 208 rectifies and smoothes alternating current (AC) supplied through the received power measuring device 206 from the wireless power transmitter 104 to produce direct current (DC) power and supplies the power, indicated pd, to the devices 250.

The power consumption measuring device 210 measures the present power consumption pd of the devices 250 and supplies a level Pd of the measured power consumption pd to the deciding unit 230. Here, the power consumption pd measured by the power consumption measuring device 210 indicates an average power consumption of the devices 250 for a short time. The devices 250 are supplied with the DC power pd from the power converter 208 through the power consumption measuring device 210. The margin determining unit 220 determines a margin power level (value) Pm indicating a variable margin of the power consumption pd based on with operating modes of the devices 250 with reference to a table representing the relationship between the operating modes of the devices (elements) 250 and margin power levels Pm and supplies the determined margin power level Pm to the deciding unit 230. In this case, the term "margin" means an extra amount of power for accommodating a variation in power consumption of the devices 250.

The deciding unit 230 calculates a necessary variation (difference) or increase or decrease ΔPt in the transmitting power level Pt in the power transmitting station 10 based on the received power level Pr, the power consuming level Pd, the margin power level Pm, and a power transmitting efficiency Etr (or the transmitting power level Pt) and supplies the variation ΔPt to the transmitter-receiver 260. The transmitter-receiver 260 transmits information indicating the necessary variation ΔPt in the transmitting power level Pt as feedback information to the power transmitting station 10.

A memory area of the transmitter-receiver 260 or a memory device (250) holds authenticating information or identifying information (e.g., ID and password). The transmitter-receiver 260 transmits the authenticating information together with necessary information to the power transmitting station 10.

Figures 2, 3:
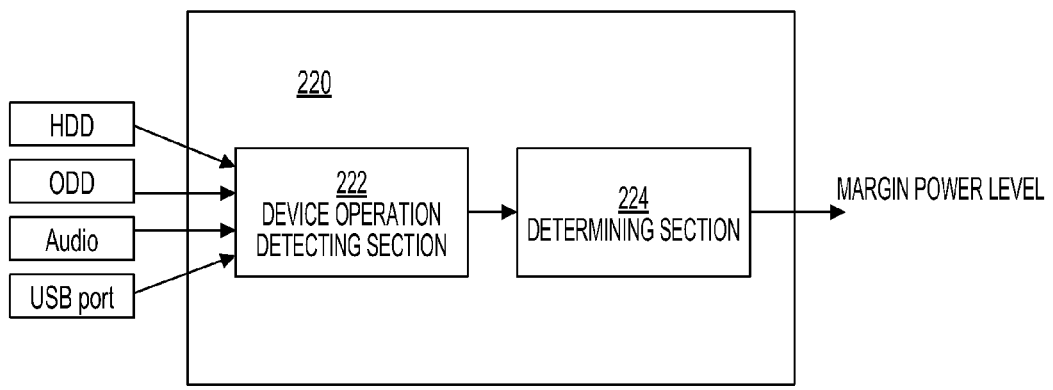
FIG. 2 depicts an example of a configuration of a margin determining unit.
FIG. 3 represents an example of a relationship between devices (elements) in operation and margin power levels.

FIG. 2 depicts an exemplary configuration of the margin determining unit 220. FIG. 3 represents an example of the relationship between the devices (elements) which are in operation and the margin power levels Pm. The margin power levels Pm represented in FIG. 3 denote margin power levels for devices other than the CPU. The margin power for the CPU is set to, for example, 10 W, irrespective of the operating modes of the other devices.

The margin determining unit 220 includes a device operation detecting section 222 and a determining section 224. The device operation detecting section 222 detects an operating mode of each of the devices (250) and supplies information regarding the types of the devices in operation to the determining section 224. The determining section 224 determines or calculates a margin power level Pm in accordance with the information regarding the devices in operation based on the table representing the relationship between the operating modes of the devices and the margin power levels Pm.

Figure 4:
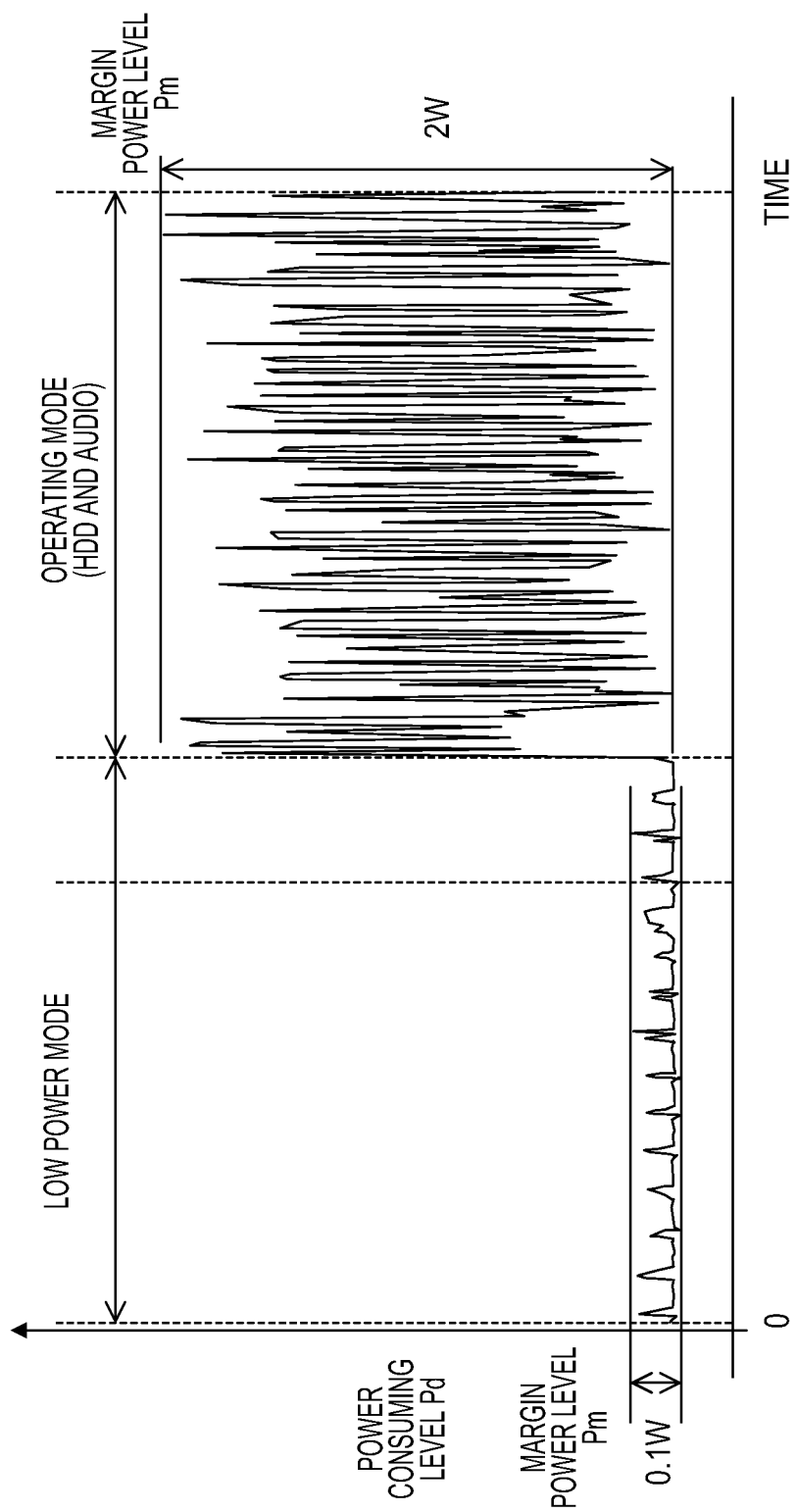
FIG. 4 illustrates margin power levels in operating modes of devices.

FIG. 4 illustrates an example of the margin power level Pm according to the operating modes of some devices of the devices 250. The margin power level Pm illustrated in FIG. 4 is equal to margin power of the devices excluding the CPU. The margin power for the CPU is, for example, 10 W irrespective of the operating modes of the other devices.

As illustrated on the left of FIG. 4, when only the CPU of the devices 250 operates, the devices 250 require margin power of 10 W for the CPU and the margin power of 0.1 W for the other devices, namely, require total margin power of 10.1 W (Pm=10.1 W). As illustrated on the right of FIG. 4, while the hard disk drive (HDD) and the audio device of the devices 250 are in operation in addition to the CPU, the devices 250 require margin power of 10 W for the CPU and margin power of 2 W for the hard disk drive and the audio device, namely, total margin power of 12 W (Pm=12 W).

Figure 5:
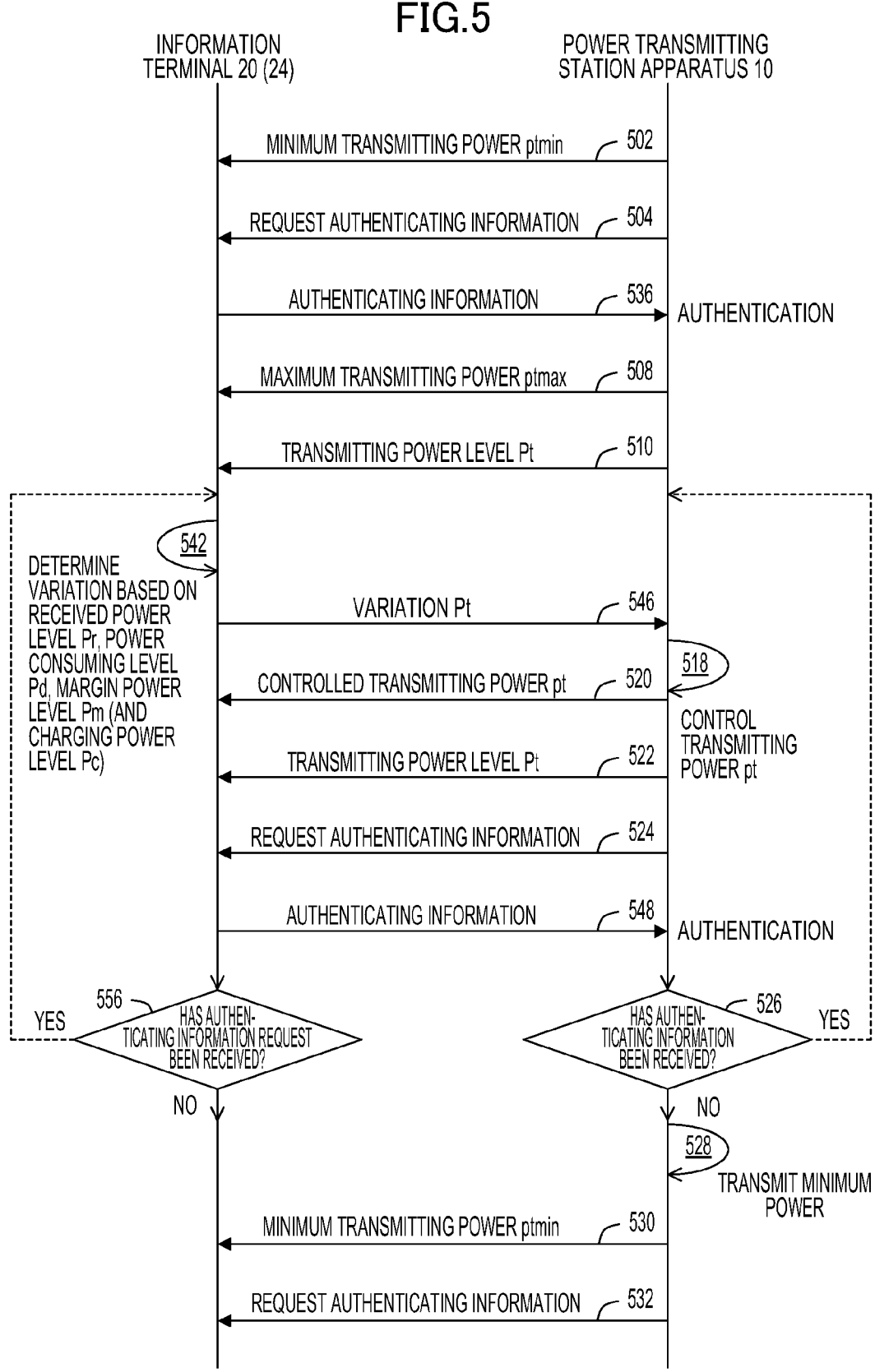
FIG. 5 represents an example of a procedure for transmission, reception, and processing between the power transmitting station and the information terminal in FIG. 1.

FIG. 5 represents an example of a procedure for transmission, reception, and processing between the power transmitting station 10 and the information terminal 20 in FIG. 1.

The procedure represented in FIG. 5 is started when the controller 102 of the power transmitting station 10 is activated in response to, for example, power-on by a user. First, the controller 102 of the power transmitting station 10 activates or enables the transmitter-receiver 160. In the operation 502, the controller 102 or the transmitter-receiver 160 activates and initializes the wireless power transmitter 104 and controls the wireless power transmitter 104 to transmit minimum transmitting power ptmin (in the operation 502). The wireless power transmitter 104 first transmits power for minimum power supply necessary to operate the transmitter-receiver 260 in the information terminal 20. On the other hand, in the information terminal 20, the received power measuring device 206, the power converter 208, the power consumption measuring device 210, and the transmitter-receiver 260 are operable at any time. The wireless power receiver 204 first receives the minimum transmitting power ptmin necessary to be transmitted and received by the transmitter-receiver 260 from the power transmitting station 10 and keeps its operation using the received power pr. Alternatively, the controller 202 or the transmitter-receiver 260 in the information terminal 20 may first be supplied with power from a rechargeable battery (not illustrated) of the devices 250 in response to power-on by the user and be activated.

In the operation 504, the transmitter-receiver 160 of the power transmitting station 10 modulates an RF carrier with data to request authenticating information or identifying information of a power receiving station in accordance with a request from the controller 102, and periodically transmits an RF signal carrying the authenticating information request. The transmitter-receiver 260 of the information terminal 20 receives and demodulates the RF signal carrying the authenticating information request. The transmitter-receiver 260 may supply the request to the controller 202. In the operation 536, the transmitter-receiver 260 of the information terminal 20 transmits an RF signal carrying the authenticating information or identifying information (e.g., ID) of the information terminal 20 under the control of the controller 202 in response to the request. The transmitter-receiver 160 of the power transmitting station 10 receives and demodulates the RF signal carrying the authenticating information and then supplies the received authenticating information to the controller 102. The controller 102 compares the authenticating information with authenticating information stored in the memory 106 or compares the identifying information with identifying information stored in the memory 106, thus authenticating the information terminal 20.

When the information terminal 20 is successfully authenticated, in the operation 508, the controller 102 controls the wireless power transmitter 104 to transmit maximum transmitting power ptmax in an initial control state. The wireless power receiver 204 receives the maximum transmitting power from the power transmitting station 10 and operates the devices 250 using the received power pr.

Whereas, if the authentication of the information terminal 20 is unsuccessful, information received from the information terminal 20 is ignored and is not processed. As described above, the power transmitting station 10 controls the wireless power transmitter 104 in accordance with the result of authentication of the information terminal 20. Consequently, the power transmitting station 10 may be prevented from being illegally controlled by an unauthorized apparatus.

In the operation 510, the controller 102 of the power transmitting station 10 supplies information concerning the present transmitting power level Pt of the wireless power transmitter 104 to the transmitter-receiver 160. The transmitter-receiver 160 transmits an RF signal carrying the information concerning the present transmitting power level Pt of the wireless power transmitter 104 to the information terminal 20. The transmitter-receiver 260 of the information terminal 20 receives and demodulates the RF signal carrying the information concerning the transmitting power level Pt of the wireless power transmitter 104 and then supplies the information concerning the transmitting power level Pt to the deciding unit 230.

In the operation 542, the deciding unit 230 of the information terminal 20 determines a necessary power level (Pd+Pm) in the information terminal 20 based on the power consuming level Pd of the devices 250 supplied from the power consumption measuring device 210 and the margin power level Pm supplied from the margin determining unit 220. Subsequently, the deciding unit 230 determines a necessary variation or increase/decrease in the transmitting power level Pt of the wireless power transmitter 104 based on the received power level Pr of the received power measuring device 206, the necessary power level (Pd+Pm) in the information terminal 20, the received transmitting power level Pt of the wireless power transmitter 104, and the power transmitting efficiency Etr. In this case, the transmitting efficiency Etr is a value obtained by dividing the received power level Pr by the transmitting power level Pt and is expressed by the equation of Etr=Pr/Pt. For example, in a case where the distance between the information terminal 20 and the power transmitting station 10 ranges from 1 to 2 m, the efficiency Etr ranges from 0.5 to 0.33. Thus, the deciding unit 230 determines a value of the necessary variation ΔPt. The necessary variation ΔPt is given by the equation of ΔPt=(Pd+Pm−Pr)/Etr. The variation ΔPt has a positive or negative value or a value of 0. Then, the deciding unit 230 supplies the determined necessary variation ΔPt as the result of determination or a control signal to the adaptive signal processor 60.

In the operation 546, the transmitter-receiver 260 of the information terminal 20 transmits an RF signal carrying the necessary variation ΔPt, which serves as feedback information or the result of determination, to the power transmitting station 10. The transmitter-receiver 160 of the power transmitting station 10 receives and demodulates the RF signal carrying the necessary variation ΔPt as the result of determination and then supplies the variation ΔPt to the controller 102.

In the operation 518, the controller 102 of the power transmitting station 10 controls, or increases or decreases the transmitting power pt of the wireless power transmitter 104 in accordance with the necessary variation ΔPt.

In the operation 520, the wireless power transmitter 104 of the power transmitting station 10 transmits the transmitting power pt in accordance with the controlled transmitting power level Pt. In the operation 522, the controller 102 supplies information concerning the present transmitting power level Pt to the transmitter-receiver 160. The transmitter-receiver 160 transmits an RF signal carrying the information concerning the present transmitting power level Pt of the wireless power transmitter 104 to the information terminal 20.

In the operation 524, the transmitter-receiver 160 of the power transmitting station 10 periodically transmits an RF signal carrying a request for authenticating information of a power receiving station in accordance with a request from the controller 102. In the operation 548, the transmitter-receiver 260 of the information terminal 20 receives and demodulates the RF signal carrying the authenticating information request and then transmits an RF signal carrying the authenticating information of the information terminal 20 in response to the request. The transmitter-receiver 160 of the power transmitting station 10 receives and demodulates the RF signal carrying the authenticating information and then supplies the received authenticating information to the controller 102. The controller 102 compares the authenticating information with authenticating information stored in the memory 106, thus authenticating the information terminal 20.

In the operation 556, the controller 202 or the transmitter-receiver 260 of the information terminal 20 determines whether an authenticating information request has been received. If it is determined that an authenticating information request has been received, the process returns to the operation 542. In the operation 526, the controller 102 of the power transmitting station 10 determines whether authenticating information has been received. If it is determined that authenticating information has been received, the process returns to the operation 546. That is, the controller 102 is in standby mode ready to receive a variation ΔPt.

The power transmitting station 10 repeats the operations 518 to 526 in FIG. 5 and the information terminal 20 repeats the operations 542 to 556.

If it is determined in the operation 526 that authenticating information has not been received, in the operation 528, the controller 102 or the transmitter-receiver 160 of the power transmitting station 10 initializes the wireless power transmitter 104 and controls the wireless power transmitter 104 to transmit the minimum transmitting power ptmin. In the operation 530, the wireless power transmitter 104 transmits the minimum transmitting power ptmin necessary for transmission and reception of the transmitter-receiver 260 of the information terminal 20.

In the operation 532, the transmitter-receiver 160 of the power transmitting station 10 periodically transmits an RF signal carrying an authenticating information request of a power receiving station in accordance with a request from the controller 102.

Figure 6:
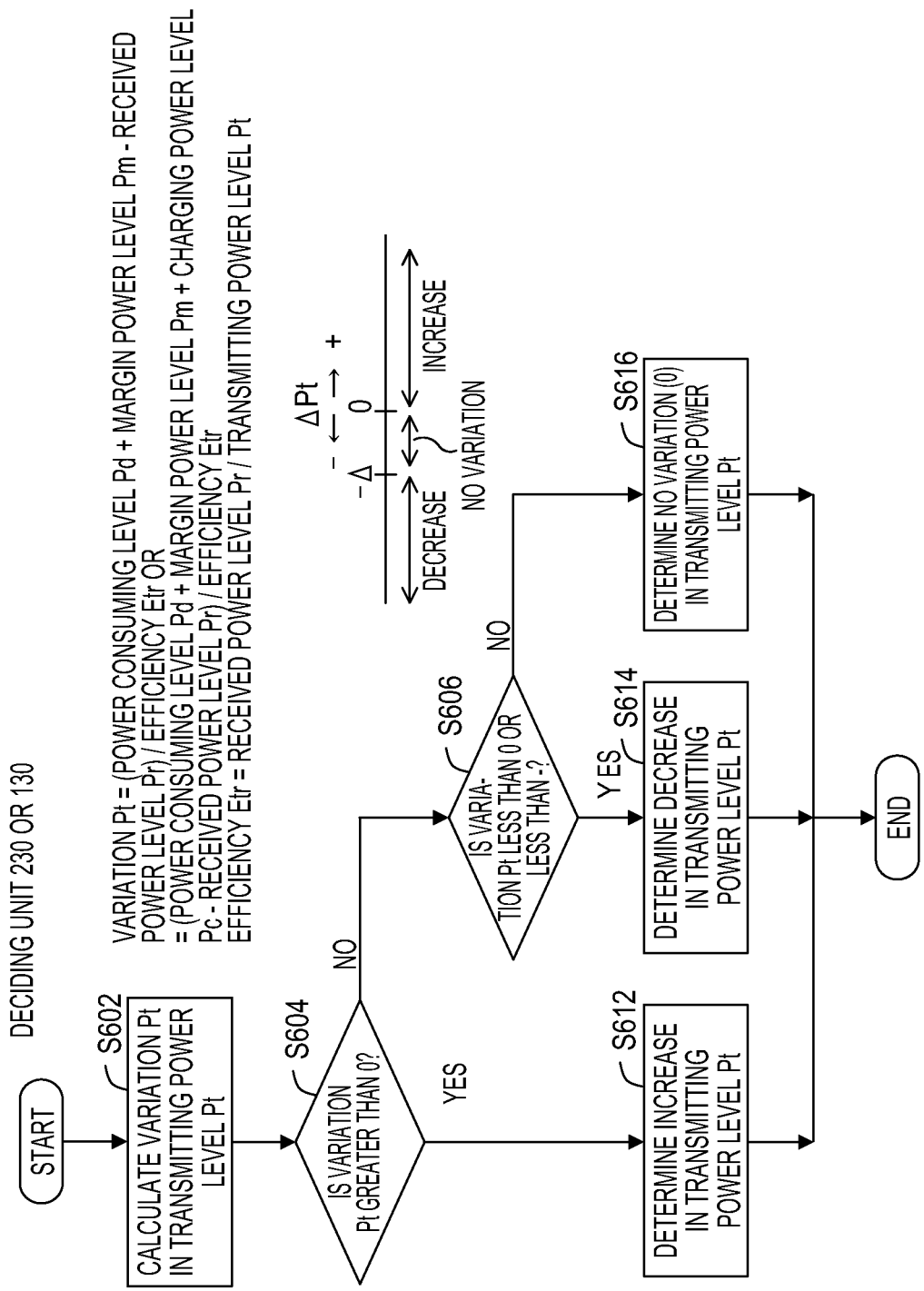
FIG. 6 represents an operation chart of an exemplary process to determine a variation, increase or decrease in transmitting power through a deciding unit of the power transmitting station.

FIG. 6 represents an operation chart of a process, performed by the deciding unit 230, to determine a variation or increase/decrease ΔPt in transmitting power level Pt.

Referring to FIG. 6, in the operation S602, the deciding unit 230 calculates a variation or increase/decrease ΔPt in transmitting power level Pt of the wireless power transmitter 104 using the following equations.

Variation ΔPt=(Power consuming level Pd+Margin power level Pm−Received power level Pr)/Efficiency Etr Efficiency Etr=Received power level Pr/Transmitting power level Pt In the operation S604, the deciding unit 230 determines whether the variation ΔPt is a positive value (ΔPt>0). If it is determined that it is not a positive value, the deciding unit 230 determines in the operation S606 whether the variation ΔPt is a negative value (ΔPt<0) or is less than a negative tolerance Δ (ΔPt<−Δ).

When it is determined in the operation S604 that the variation ΔPt is a positive value, the deciding unit 230 determines in the operation S612 that the variation ΔPt in the transmitting power level Pt is an increase. When it is determined in the operation S606 that the variation ΔPt is a negative value or is less than the negative tolerance −Δ, the deciding unit 230 determines in the operation S614 that the variation ΔPt in the transmitting power level Pt is a decrease. A tolerance Δ is used to avoid unnecessary, often change of the transmitting power level Pt and is, for example, 0.1 W. When it is determined in the operation S606 that the variation ΔPt is not a negative value or is not less than the negative tolerance −Δ, the deciding unit 230 determines in the operation S616 that there is no variation ΔPt in the transmitting power level Pt (ΔPt=0).

Figure 7:
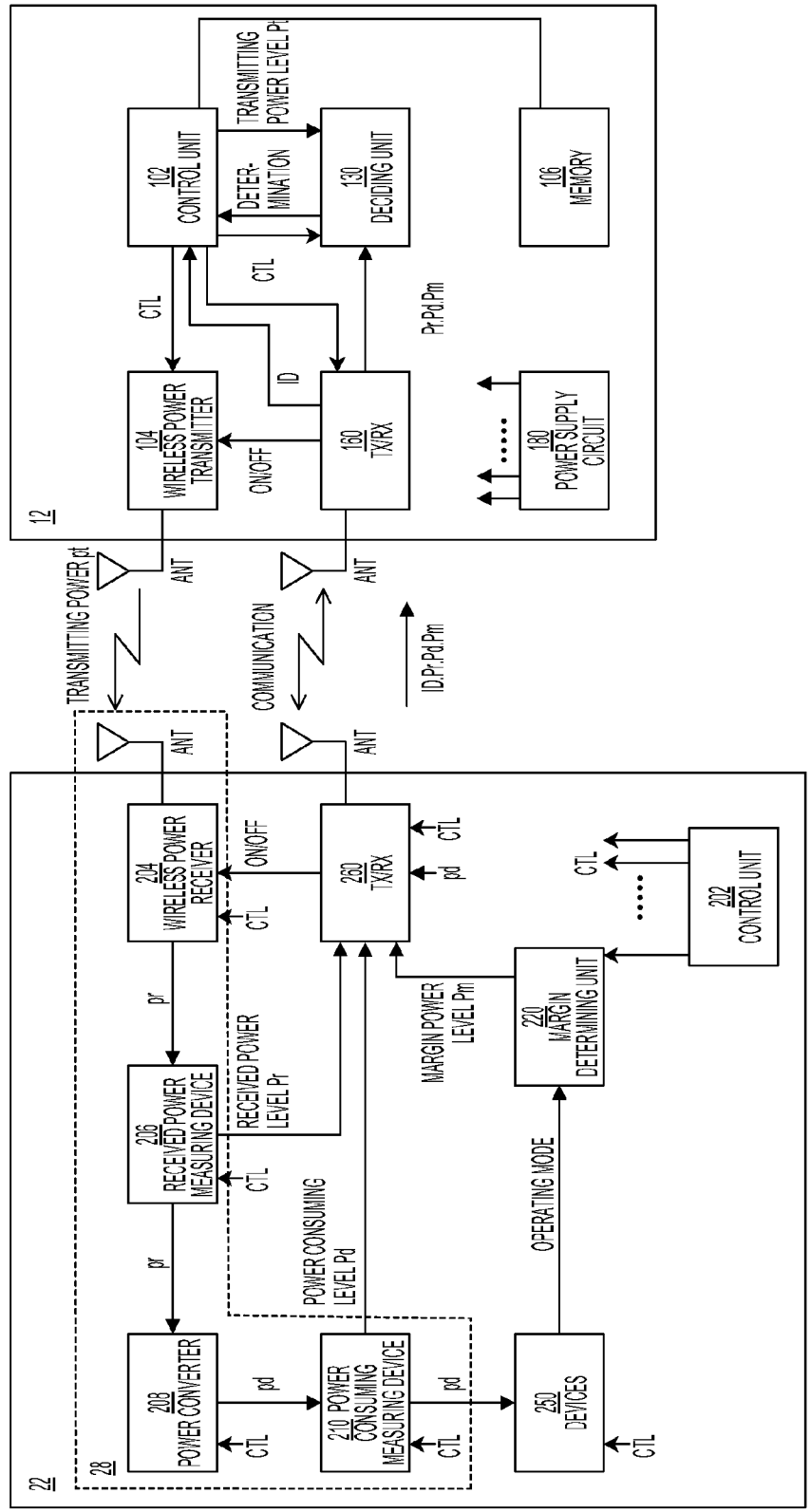
FIG. 7 depicts a modification of the wireless power transmitting system of FIG. 1 and depicts an example of a wireless power transmitting system according to another embodiment of the present invention, the system including a power transmitting station and an information terminal or electronic apparatus which serves as a power receiving station.

FIG. 7 depicts a modification of the wireless power transmitting system of FIG. 1 and depicts a wireless power transmitting system according to another embodiment of the present invention, the system including a power transmitting station 12 and an information terminal or electronic apparatus 22 that serves as a power receiving station.

Referring to FIG. 7, the power transmitting station 12 includes a deciding unit 130 in addition to the elements 102 to 106, 160, and 180 in FIG. 1. The information terminal 22 includes the elements 202 to 220, 250, and 260. In this embodiment, the information terminal 22 does not include the deciding unit 230. The deciding unit 130 makes a determination in a manner similar to the deciding unit 230.

The transmitter-receiver 260 of the information terminal 22 receives information indicating a received power level Pr, information indicating a power consuming level Pd, and information indicating a margin power level Pm from the received power measuring device 206, the power consumption measuring device 210, and the margin determining unit 220, respectively, and transmits an RF signal carrying the information to the power transmitting station 12. The transmitter-receiver 160 of the power transmitting station 12 receives and demodulates the RF signal and supplies the information indicating the received power level Pr, the power consuming level Pd, and the margin power level Pm to the deciding unit 130. The deciding unit 130 receives information indicating a transmitting power level Pt from the controller 102.

The deciding unit 130 calculates a necessary variation ΔPt in transmitting power level Pt of the power transmitting station 12 based on the received power level Pr, the power consuming level Pd, and the margin power level Pm, and a power transmitting efficiency Etr (or the transmitting power level Pt), and supplies the variation ΔPt as a result of determination, feedback information, or a control signal to the controller 102. The controller 102 controls transmitting power pt of the wireless power transmitter 104 based on the variation ΔPt received from the deciding unit 130.

The other elements in FIG. 7 and their operations are the same as those in FIG. 1.

Figure 8:
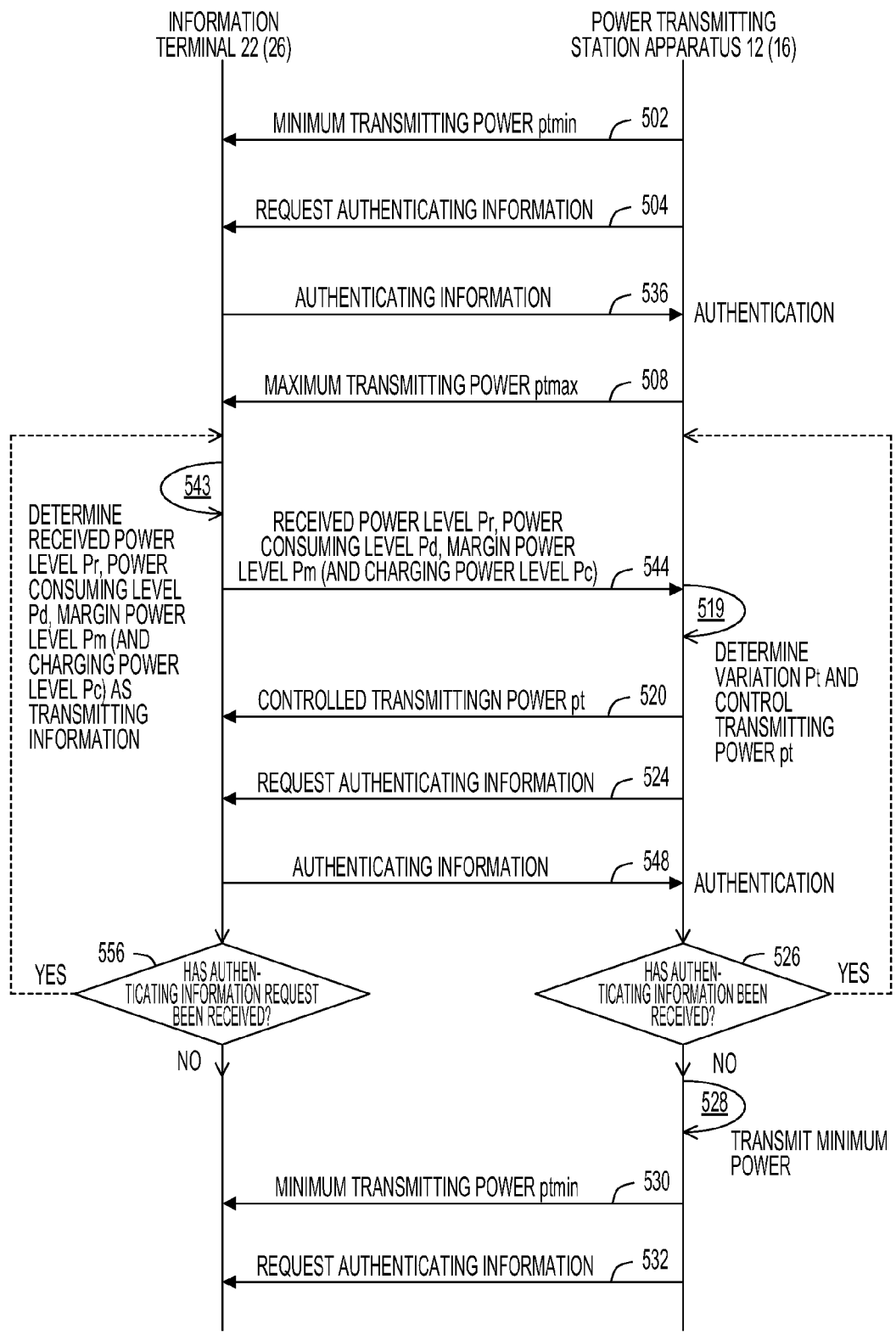
FIG. 8 represents a modification of the procedure of FIG. 5 and represents an exemplary procedure for transmission, reception, and processing between the power transmitting station and the information terminal in FIG. 7.

FIG. 8 represents a modification of the procedure of FIG. 5 and represents an example of a procedure for transmission, reception, and processing between the power transmitting station 12 and the information terminal 22 in FIG. 7.

Referring to FIG. 8, the operations 502 to 508, 520, 524, 536, and 548 are the same as those in FIG. 5. In the procedure represented in FIG. 8, the operations 510, 522, and 546 in FIG. 5 may be omitted.

In the operation 543, the transmitter-receiver 260 of the information terminal 22 receives a received power level Pr, a power consuming level Pd, and a margin power level Pm from the received power measuring device 206, the power consumption measuring device 210, and the margin determining unit 220, respectively, and determines such received information as transmitting information.

In the operation 544, the transmitter-receiver 260 of the information terminal 22 transmits an RF signal carrying the information indicating the received power level Pr, the power consuming level Pd, and the margin power level Pm to the power transmitting station 12. The transmitter-receiver 160 of the power transmitting station 12 receives and demodulates the RF signal carrying the information and then supplies the information to the deciding unit 130.

In the operation 519, the deciding unit 130 of the power transmitting station 12 determines a necessary variation in the transmitting power level Pt of the wireless power transmitter 104 based on the power consuming level Pd, the margin power level Pm, the received power level Pr, the transmitting power level Pt, and the power transmitting efficiency Etr, thus determining a necessary variation ΔPt. The necessary variation ΔPt is given by the equation of ΔPt=(Pd+Pm−Pr)/Etr. Subsequently, the deciding unit 130 supplies the determined necessary variation ΔPt as a result of determination or a control signal to the controller 102. The controller 102 controls, increases or decreases transmitting power of the wireless power transmitter 104 based on the variation ΔPt.

The operations 526 to 532 and the operation 556 in FIG. 8 are the same as those in FIG. 5.

The power transmitting station 12 repeats the operations 519 to 526 in FIG. 8 and the information terminal 22 repeats the operations 543 to 556.

In a case where the power consumption of the devices 250 of each of the information terminals 20 and 22 in FIGS. 1 and 7 relatively gently varies and a variation is absorbed by a margin, the transmitting power of each of the power transmitting stations 10 and 12 is controlled in a power saving manner in each of the embodiments in FIGS. 1 and 7.

Each of the information terminals 20 and 22 may include a small-capacity rechargeable battery. When the power consumption pd of the circuits 250 instantaneously increases sharply, alternatively, when a supply voltage of the power converter 208 is instantaneously lower than a threshold value, supply power pb of the battery may compensate for the instantaneous power shortage or voltage drop. For example, even when the power consuming level Pd of the devices 250 of the information terminal 20 or 22 sharply significantly varies to such extent that the power transmitting station 10 or 12 may not follow a variation ΔPt in transmitting power level, the devices 250 of the information terminal 20 or 22 may be prevented from malfunctioning.

The process illustrated by the operation chart in FIG. 6 is also performed by the deciding unit 130.

Figure 9:
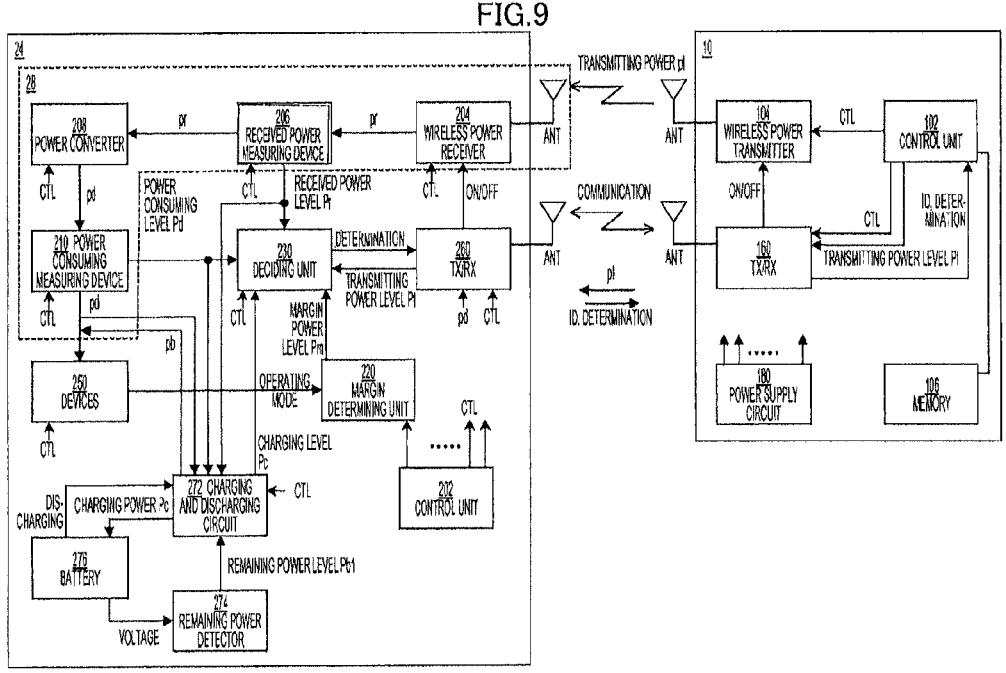
FIG. 9 depicts another modification of the wireless power transmitting system of FIG. 1 and depicts an example of a wireless power transmitting system according to further another embodiment of the present invention, the system including a power transmitting station and an information terminal or electronic apparatus which serves as a power receiving station.

FIG. 9 depicts another modification of the wireless power transmitting system of FIG. 1 and depicts a wireless power transmitting system according to further another embodiment of the present invention, the system including the power transmitting station 10 and an information terminal or electronic apparatus 24 that serves as a power receiving station.

Referring to FIG. 9, the information terminal 24 includes a charging and discharging circuit 272, a remaining power detector 274, and a rechargeable battery 276 in addition to the elements 202 to 260 in FIG. 1. The rechargeable battery 276 may be a small-capacity battery. The remaining power detector 274 detects a remaining power level Pbl of the battery 276 based on an output voltage of the battery. The charging and discharging circuit 272 receives information concerning a received power level Pr from the received power measuring device 206, receives information concerning a power consuming level Pd from the power consumption measuring device 210, and receives information concerning the remaining power level Pbl of the battery 276 from the remaining power detector 274. The charging and discharging circuit 272 controls charging power pc or current supply to the battery 276 in accordance with the information, thus controlling the supply of DC power pb from the battery 276 to the devices 250.

Accordingly, even if the difference (Pr−Pd) between the received power level Pr and the power consuming level Pd is less than or equal to a threshold value or is equal to zero such that the power consumption pd of the devices 250 is not instantaneously compensated by the received power pr of the wireless power receiver 204, the power consumption may be instantaneously compensated by the power pb supplied from the battery 276.

When the remaining power level Pbl of the battery 276 is less than or equal to a threshold value Pbth, the charging and discharging circuit 272 determines a charging power level Pc necessary for charging the battery 276 and supplies information concerning the charging power level Pc to the deciding unit 230.

The deciding unit 230 calculates a necessary variation ΔPt in transmitting power level Pt in the power transmitting station 10 based on the received power level Pr, the power consuming level Pd, a margin power level Pm, the charging power level Pc, and a power transmitting efficiency Etr (or a transmitting power level Pt). The necessary variation ΔPt is given by the equation of ΔPt=(Pd+Pm+Pc−Pr)/Etr. The deciding unit 230 supplies the variation ΔPt to the transmitter-receiver 260. The transmitter-receiver 260 transmits information indicating the necessary variation ΔPt in the transmitting power level Pt as feedback information to the power transmitting station 10.

The charging and discharging circuit 272 determines a variation ΔPr in the received power level Pr. When determining that the variation ΔPr is an increase and the charging power level Pc may be ensured based on of the received power level Pr and the charging power level Pc (Pr−Pd>Pc), the charging and discharging circuit 272 starts charging the battery 276. When the amount of power charged in the battery 276 detected by the remaining power detector 274 is full or not less than the necessary charging power level Pc (the difference between the received power level Pr from the received power measuring device 206 and the power consuming level Pd from the power consumption measuring device 210) is less than or equal to a threshold value Pcth, the charging and discharging circuit 272 stops charging the battery 276.

The other elements in FIG. 9 and the operations thereof are the same as those elements in FIG. 1.

Figure 10:
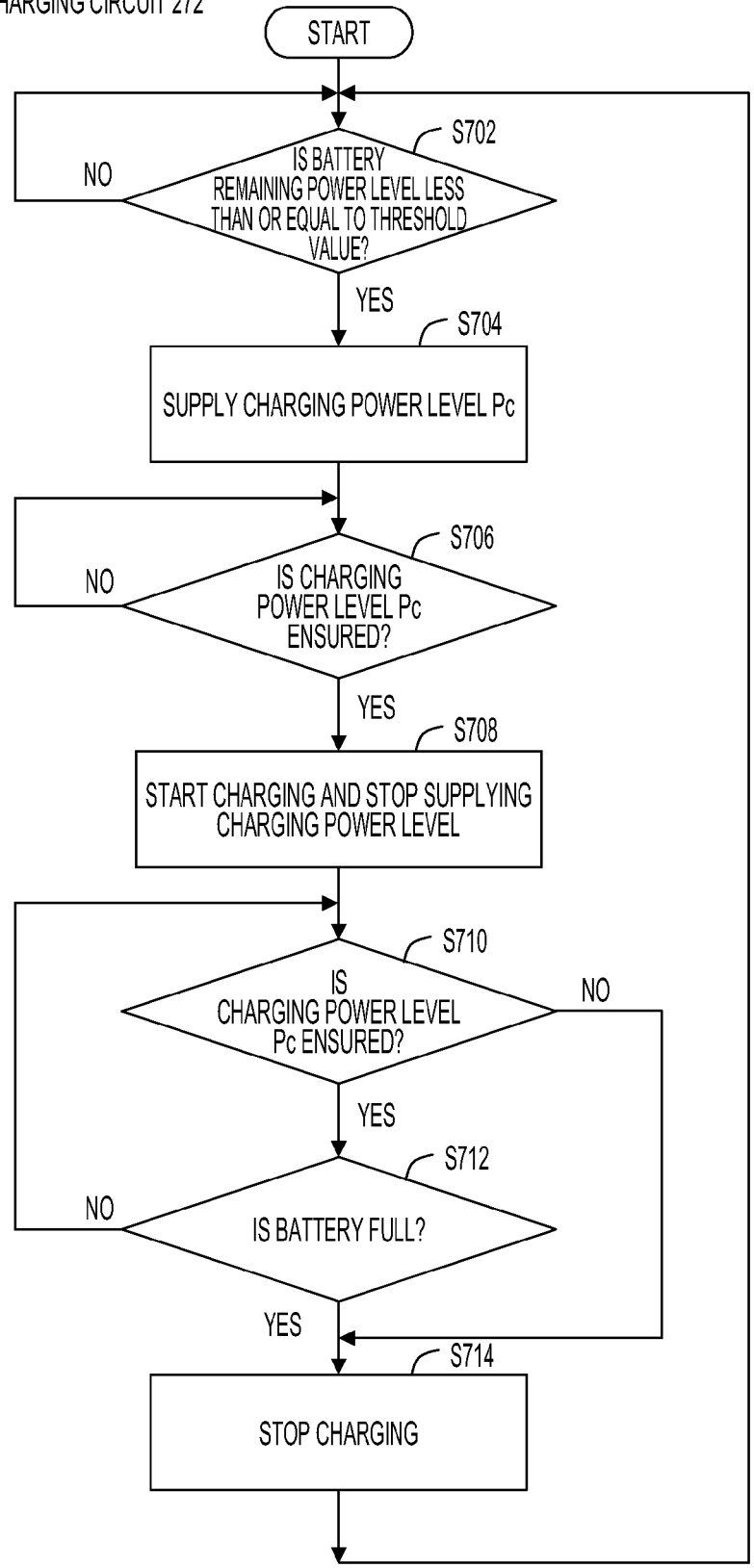
FIG. 10 represents an exemplary procedure for battery charging control performed by a charging and discharging circuit.

FIG. 10 represents a process, performed by the charging and discharging circuit 272, to control the charge of the battery 276.

Referring to FIG. 10, in the operation S702, the charging and discharging circuit 272 determines whether a remaining power level Pbl of the battery 276 detected by the remaining power detector 274 is less than or equal to the threshold value Pbth. The operation S702 is repeated until it is determined that the level is less than or equal to the threshold value.

When determining in the operation S702 that the remaining power level Pbl is less than or equal to the threshold value, in the operation S704, the charging and discharging circuit 272 supplies a charging power level Pc necessary for charging the battery 276 to the deciding unit 230.

In the operation S706, the charging and discharging circuit 272 determines, based on the difference between a received power level Pr from the received power measuring device 206 and a power consuming level Pd from the power consumption measuring device 210, whether a charging power level Pc necessary to charge the battery 276 is ensured (Pr−Pd>Pc). The operation S706 is repeated until it is determined that the necessary charging power level Pc is ensured.

When it is determined in the operation S706 that the necessary charging power level Pc is ensured, in the operation S708, the charging and discharging circuit 272 starts to charge the battery 276 and stops the supply of the charging power level Pc to the deciding unit 230 during charging. The power consuming level Pd of the devices 250 and the battery 276 is measured by the power consumption measuring device 210.

In the operation S710, the charging and discharging circuit 272 determines, based on the difference between the received power level Pr from the received power measuring device 206 and the power consuming level Pd from the power consumption measuring device 210, whether the charging power level Pc necessary to charge the battery 276 is ensured. When the difference (Pr−Pd) between the received power level Pr and the power consuming level Pd is less than or equal to the threshold value or is equal to zero, it is determined that the necessary charging power level Pc is not ensured. When it is determined that the necessary charging power level Pc is not ensured, the process proceeds to the operation S714.

When it is determined in the operation S710 that the necessary charging power level Pc is ensured, in the operation S712, the charging and discharging circuit 272 determines, based on a remaining power level Pbl of the battery 276 detected by the remaining power detector 274, whether the power remaining level Pbl of the battery 276 indicates full. If it is determined that the power remaining level does not indicate full, the process returns to the operation S710. If it is determined that the power remaining level indicates full, the process goes to the operation S714. The operations S710 and S712 are repeated until the necessary charging power level Pc is not ensured, alternatively, until the remaining power level Pbl of the battery 276 indicates full.

In the operation S714, the charging and discharging circuit 272 stops charging the battery 276. After that, the process returns to the operation S702.

As described above, when the power consuming level Pd of the devices 250 instantaneously increases, alternatively, when a supply voltage pd of the power converter 208 instantaneously falls below a threshold value, the instantaneous power shortage may be compensated for by the supply power pb of the battery 276, thus preventing malfunction of the devices 250 in the information terminal 24.

The process of FIG. 5 is also used in the wireless power transmitting system of FIG. 9.

In this case, in the operation 542 in FIG. 5, the deciding unit 230 of the information terminal 24 determines a necessary power level (Pd+Pm+Pc) in the information terminal 24 based on the power consuming level Pd of the devices 250 including the battery 276, the margin power level Pm, and the necessary charging power level Pc supplied from the charging and discharging circuit 272. Subsequently, the deciding unit 230 determines a necessary variation or increase/decrease in the transmitting power level Pt of the wireless power transmitter 104 based on the received power level Pr, the necessary power level (Pd+Pm+Pc) in the information terminal 24, the transmitting power level Pt of the wireless power transmitter 104, and the power transmitting efficiency Etr. Then, the deciding unit 230 supplies the determined variation ΔPt as the result of determination to the transmitter-receiver 260.

The process illustrated by the operation chart of FIG. 6 is also performed by the deciding unit 230.

In this case, in the operation S602 in FIG. 6, the deciding unit 230 calculates a variation or increase/decrease ΔPt in the transmitting power level Pt of the wireless power transmitter 104 using the following equations.

Figure 11:
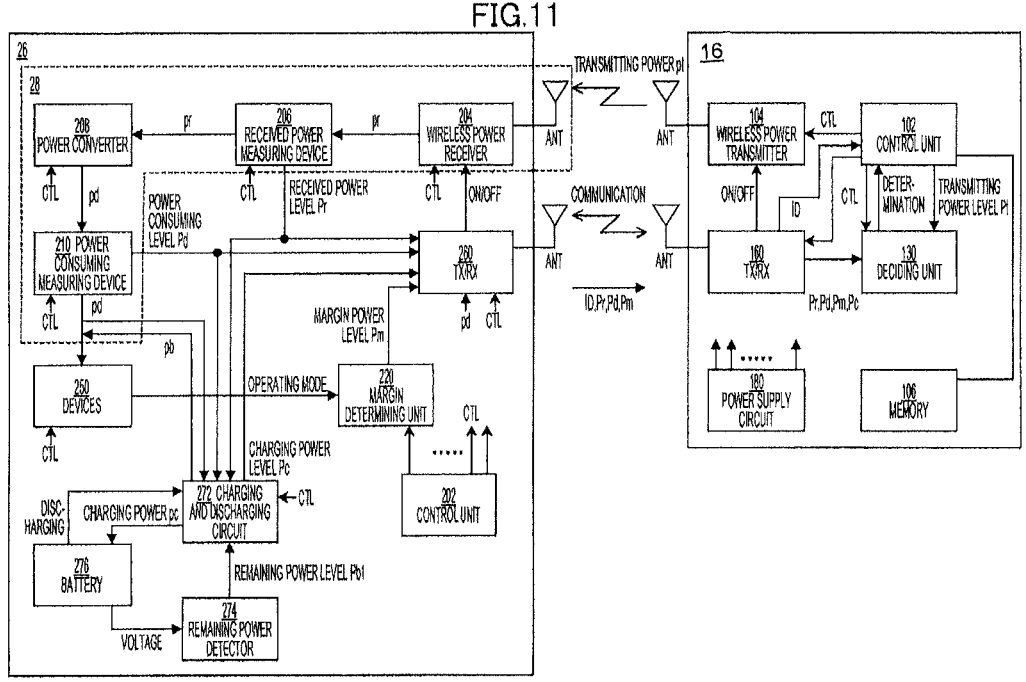
FIG. 11 depicts a modification of the wireless power transmitting system of FIG. 9 and depicts an example of a wireless power transmitting system according to further another embodiment of the present invention, the system including a power transmitting station and an information terminal or electronic apparatus which serves as a power receiving station.

Variation ΔPt=(Power consuming level Pd+Margin power level Pm+Charging power level Pc−Received power level Pr)/Efficiency Etr Efficiency Etr=Received power level Pr/Transmitting power level Pt FIG. 11 depicts a modification of the wireless power transmitting system of FIG. 9 and depicts an example of a wireless power transmitting system according to further another embodiment of the present invention, the system including a power transmitting station 16 and an information terminal or electronic apparatus 26 that serves as a power receiving station.

Referring to FIG. 11, the power transmitting station 16 includes the deciding unit 130 in addition to the elements 102 to 106, 160, and 180 in FIG. 1. The information terminal 26 includes the elements 202 to 220 and 250 to 276 in FIG. 9. In this embodiment, the information terminal 26 does not include the deciding unit 230. The deciding unit 130 makes a determination in a manner similar to the deciding unit 230 in FIG. 9.

The transmitter-receiver 260 of the information terminal 26 receives information indicating a received power level Pr from the received power measuring device 206, information indicating a power consuming level Pd from the power consumption measuring device 210, information indicating a margin power level Pm from the margin determining unit 220, and information indicating a necessary charging power level Pc from the charging and discharging circuit 272, and then transmits an RF signal carrying the information to the power transmitting station 16. The transmitter-receiver 160 of the power transmitting station 16 receives and demodulates the RF signal and then supplies the information indicating the received power level Pr, the power consuming level Pd, the margin power level Pm, and the necessary charging power level Pc to the deciding unit 130. The deciding unit 130 further receives information indicating a transmitting power level Pt from the controller 102.

The deciding unit 130 calculates a necessary variation ΔPt in the transmitting power level Pt in the power transmitting station 16 based on the received power level Pr, the power consuming level Pd, the margin power level Pm, the charging power level Pc, and a power transmitting efficiency Etr (or the transmitting power level Pt), and supplies the variation ΔPt to the controller 102. The controller 102 controls, or increases or decreases transmitting power pt of the wireless power transmitter 104 based on the variation ΔPt.

The other elements in FIG. 11 and the operations thereof are the same as those in FIG. 7 or 9.

The process of FIG. 8 is also used in the wireless power transmitting system of FIG. 11.

In this case, in the operation 543 in FIG. 8, the transmitter-receiver 260 of the information terminal 26 receives information indicating a received power level Pr from the received power measuring device 206, information indicating a power consuming level Pd from the power consumption measuring device 210, information indicating a margin power level Pm from the margin determining unit 220, and information indicating a necessary charging power level Pc from the charging and discharging circuit 272, and determines the information as transmitting information.

In the operation 544, the transmitter-receiver 260 of the information terminal 26 transmits an RF signal carrying the information indicating the received power level Pr, the power consuming level Pd, the margin power level Pm, and the necessary charging power level Pc to the power transmitting station 16.

In the operation 519, the deciding unit 130 of the power transmitting station 16 decides a variation or increase/decrease in transmitting power level Pt of the wireless power transmitter 104 based on the received power level Pr, the power consuming level Pd, the margin power level Pm, the necessary charging power level Pc from the charging and discharging circuit 272, and the transmitting power level Pt of the wireless power transmitter 104, thus determining a variation ΔPt. Subsequently, the deciding unit 230 supplies information indicating the determined variation ΔPt as the result of determination to the transmitter-receiver 260. The controller 102 controls, increases or decreases transmitting power of the wireless power transmitter 104 based on the variation ΔPt.

The process illustrated by the operation chart of FIG. 6 is also performed by the deciding unit 130.

As described above, even when a variation in power consumption of the devices 250 of each of the information terminal 24 in FIG. 9 and the information terminal 26 in FIG. 11 relatively sharply varies and the variation is not absorbed by a margin, the transmitting power of each of the power transmitting stations 10 and 16 is controlled in a power-saving manner in each of the embodiments depicted in FIGS. 9 and 11.

Further, according to an aspect of the embodiments, any combinations of the described features, functions and/or operations may be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wireless power transmitting system comprising:
a first station including a transmitting antenna that transmits a first power; and
a second station including a receiving antenna that receives power from the transmitting antenna in a wireless manner and which is operatively associated with a device operating while being supplied with the received power,
the second station executes a procedure including:
obtaining a received power level indicating a level of the received power,
obtaining a power consuming level indicating a level of power consumed by the device operating while being supplied with the received power, and
transmitting the received power level and the power consuming level to the first station by wireless; and
the first station executes a procedure including:
receiving the received power level and the power consuming level from the second station by wireless,
controlling a level of power to be transmitted to the second station through the transmitting antenna based on a difference between the received power level and the received power consuming level, and
transmitting a second power to the second station in the wireless manner based on the controlled level of power.

2. The wireless power transmitting system according to claim 1, the procedure executed by the first station further comprising:
obtaining the difference by subtracting the received power level from the power consuming level,
when the difference exceeds a threshold value, the controlling increases the level of power transmitted through the transmitting antenna.

3. The wireless power transmitting system according to claim 2, the first station further comprising:
a memory;
the procedure executed by the first station further comprising:
obtaining operating modes of the device; and
getting a margin power level corresponding to the operating mode obtained by the obtaining from the memory, the memory storing the margin power level indicating the level of margin power presenting a variation in power consumption for each operating mode of the device,
the obtaining obtains the difference by subtracting the received power level from the sum of the margin power level and the power consuming level.

4. A station that is operatively associated with a device operating while being supplied with power, the station comprising:
an antenna that receives a first power transmitted from an other station in the wireless manner; and
a processor that executes a procedure including:
obtaining a received first power level indicating a level of the received first power,
obtaining a power consuming level indicating a level of power consumed by the device operating while being supplied with the received power, and
transmitting the received first power level and the power consuming level to the other station by wireless,
the antenna receives a second power based on the received power level and the power consuming level from the other station in the wireless manner.

5. The station according to claim 4, the procedure further comprising:
generating, based on the difference between the received power level and the power consuming level, a control signal to control the level of power transmitted from the other station,
the transmitting transmits the control signal to the other station with a frequency band different from a frequency band for wireless power transmission.

6. A station comprising:
an antenna that transmits a first power to an other station in a wireless manner; and
a processor that executes a procedure including:
receiving a received power level indicating a level of power received through the antenna and a power consuming level indicating a level of power consumed by a device from the other station, the device operating while being supplied with received power,
controlling a level of power to be transmitted to the other station through the antenna based on a difference between the received power level and the received power consuming level, and
transmitting a second power supplied from a power supply to the other station in the wireless manner based on the controlled level of power.

7. The station according to claim 6, the procedure further comprising:
obtaining the difference by subtracting the received power level from the received power consuming level,
when the difference exceeds a threshold value, the controlling increases the level of power transmitted through the antenna.

8. The power transmitting station according to claim 7, further comprising:
a memory,
the procedure further comprising:
obtaining an operating mode of the device, and
getting a margin power level corresponding to the operating mode obtained by the obtaining from the memory, the memory storing the margin power level indicating the level of margin power representing a variation in power consumption for each operating mode of the device,
the obtaining obtains the difference by subtracting the received power level from the sum of the margin power level and the power consuming level.

9. A non-transitory recording medium storing a program for causing a computer to function as a station which receives a first power transmitted from an other station in a wireless manner through an antenna and is operatively associated with a device operating while being supplied with the received power, the program causing the computer to execute:
obtaining a received power level indicating a level of the received power,
obtaining a power consuming level indicating a level of power consumed by the device operating while being supplied with the received power; and transmitting the received power level and the power consuming level to the other station in the wireless manner, wherein the antenna receives from the other station in the wireless manner a second power based on a difference between the received power level and the power consuming level.

10. A non-transitory recording medium storing a program for causing a computer to function as a station which transmits a first power through an antenna to an other station in a wireless manner, the program causing the computer to execute:

receiving a received power level indicating a level of power received by the other station and a power consuming level indicating a level of power consumed by a device from the other station, the device operating while being supplied with the received power;

controlling a level of power to be transmitted to the other station through the antenna based on a difference between the received power level and the received power consuming level; and transmitting a second power supplied from a power supply to the other station in the wireless manner based on the controlled level of power.

11. The non-transitory recording medium according to claim 9, the program further causes the computer to execute:

generating, based on the difference between the received power level and the power consuming level, a control signal to control the level of power transmitted from the other station, the transmitting transmits the control signal to the other station with a frequency band different from a frequency band for wireless power transmission.

12. The non-transitory recording medium according to claim 10, the program further causes the computer to execute:

obtaining the difference by subtracting the received power level from the received power consuming level, when the difference exceeds a threshold value, the controlling increases the level of power transmitted through the antenna.

13. The non-transitory recording medium according to claim 12, the computer includes a memory, the program further causes the computer to execute:

obtaining an operating mode of the device, and getting a margin power level corresponding to the operating mode obtained by the obtaining from the memory, the memory being stored the margin power level indicating the level of margin power representing a variation in power consumption for each operating mode of the device, the obtaining obtains the difference by subtracting the received power level from the sum of the margin power level and the power consuming level.

* * * * *

UNITED STATES PATENT AND TRADEMARK OFFICE
CERTIFICATE OF CORRECTION

PATENT NO.         : 8,786,134 B2                                   Page 1 of 1
APPLICATION NO.    : 12/749670
DATED              : July 22, 2014
INVENTOR(S)        : Satoshi Kazama et al.

It is certified that error appears in the above-identified patent and that said Letters Patent is hereby corrected as shown below:

In the Claims

Column 16, Line 3, In Claim 4, after "received" insert -- first --.

Column 16, Line 4, In Claim 4, after "received" delete "first".

Column 16, Line 64, In Claim 9, delete "power," and insert -- power; --, therefor.

Signed and Sealed this
Twenty-eighth Day of October, 2014

Michelle K. Lee
*Deputy Director of the United States Patent and Trademark Office*